June 15, 1926.

B. NEWTH ET AL

ELECTRIC BATTERY FOR CLOCKS

Original Filed Nov. 26, 1923

1,589,211

Inventors
Basil Newth
Octavia Newth

By James L. Norris
Attorney

Patented June 15, 1926.

1,589,211

UNITED STATES PATENT OFFICE.

BASIL NEWTH AND OCTAVIA NEWTH, OF SYDNEY, NEW SOUTH WALES, AUSTRALIA.

ELECTRIC BATTERY FOR CLOCKS.

Original application filed November 26, 1923, Serial No. 677,048, and in Canada November 27, 1923. Divided and this application filed August 16, 1924. Serial No. 732,478.

This invention refers to electric batteries needed for timepieces or clocks in which the movement is sustained for prolonged periods without attention, with such performances included as telling the hours on a gong, exhibiting dates, ringing an alarm bell at set times, and the like.

More specifically, this invention relates to timepieces in which the movement is synchronized by a spring-held balance-wheel instead of a swinging pendulum, which timepieces are "portable" as they keep time in all positions and while being moved and during sustained movement such for instance as aboard ship.

And to such timepieces with as is often as not an alarm included but electrically operated and with a much more automatic controlling mechanism than ordinarily, to be more compatible with the use of an electric bell and with a clock not to be attended to every day.

Ordinarily balance timed portable clock movements with whatever alarm or striking or other mechanism included are as much as possible compacted within the compass of a shallow cylinder and the objective of this invention is the provision of the essential dry cell for maintenance of the time and other mechanism in a form modified to best accommodate itself to the least enlargement of the cylinder enclosing the whole clock, that is to say annular, fitting closely within the plain cylindrical case with two legs and pick-up ring usual with portable clocks, in a space reserved there or behind the movement, and there can be a plain cover, or, in the case of an alarm or striking clock, the gong, functioning as a cover, located centrally within the annulus of the battery behind the movement and readily removable, exposing adjustments of the clock underneath.

As with dry cells in general the container for the electrolyte is the zinc for the negative pole, in this case an annulus, with several carbons instead of one packed in the electrolyte, these connected to constitute collectively one pole, so that the whole shall provide the equivalent of a single cell, giving quantity rather than intensity of current.

Accessible adjustments of the clock at the back in the opening of the annulus will include a switch provided connecting the battery circuit in the clock.

Referring to the accompanying single sheet of drawings illustrating an annular space-saving battery cell installed in, for an example, a portable electric alarm clock, such annular cell constructed and arranged in accordance with this invention:—

In these drawings and throughout the description now following the same numerals indicate the same or corresponding parts throughout.

The open ended cylinder or case 20, provided to house the whole movement of the clock maintained, has the usual flange and circular glass 21 against this flange, behind which will be the usual spacing ring and dial, and the movement, and with the usual two legs and pick-up ring, such as would be omitted however should it be desired to have the cylinder within which everything is contained in turn enclosed in some more elaborate casing: all as indicated in the accompanying drawings.

Figure 3:
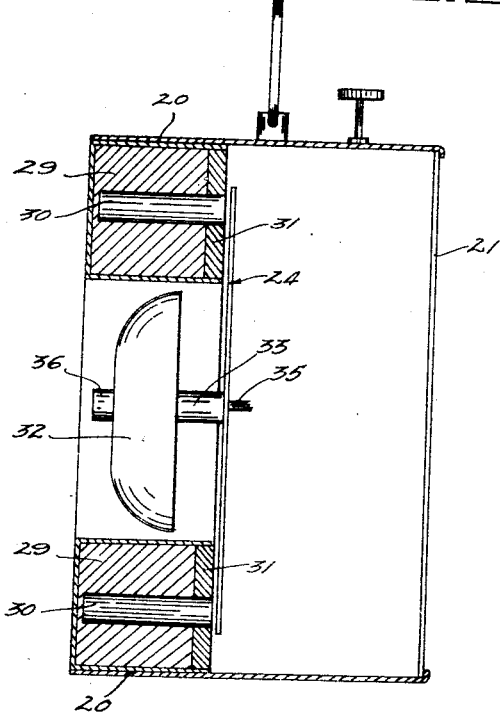
Figure 3 is a cross-sectional side elevation of the same clock, not showing the movement, clearly exhibiting the annular cell in position also in section exposing its detail.

The cylinder 20 has sufficient depth behind the movement of the clock for inclusion of the dry battery to maintain the movement, 29, as invented, in contour an annulus of rectangular cross-section, to fit the cylinder closely and flush with the back of the clock, (Fig. 3).

The battery 29 (Figs. 2 and 3) has its cylindrical outer and inner walls and the outer of its plane faces of sheet zinc, for the negative pole and for the container for the electrolyte usual in any Leclanche type dry cells. There are a number, as say six, of carbon rods 30, parallel with the axis of the annulus equally spaced and equidistant from this axis, and these are electrically connected, by wire arranged to lie within the covering of pitch 31 which is poured hot and fluid over the electrolyte in the usual way in the course of construction of the battery.

The whole arrangement is intended for the effect of one cell with a multiplicity of carbons on account of the shape of the container. The zinc or negative pole is left in electrical connection with the metal work of the clock, and the carbon or positive pole isolated the wiring buried in the pitch over the electrolyte connecting all the carbons with one common terminal of the form of a metal boss projected on the face of the pitch.

The battery 29, annular for economy of space, will have capacity for the maintenance of both the time movement, and, within reason, the alarm, in this clock, for a comparatively long time, such as at least a year, and will be readily removable for substitution of a new cell when necessary.

Figures 1, 2:
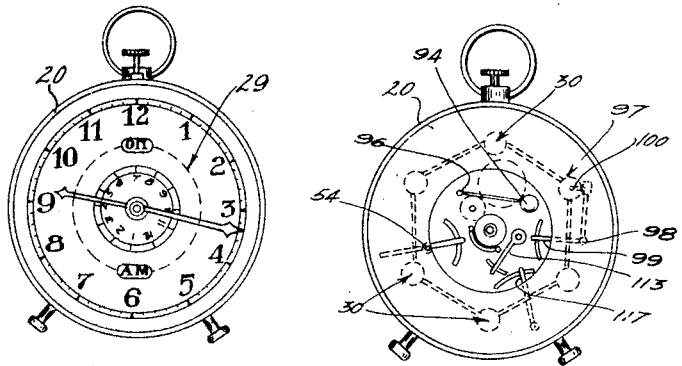
Figure 1 is a full front view of an electric balance timed portable alarm clock for the maintenance of such as which this invention would particularly apply.
Figure 2 is a rear view of a clock of this kind, exposing adjustments accessible within the annulus with the bell, acting as a cover, removed.

The space inside the annulus 29 affords room for the alarm bell 32 (Fig. 3), or a plain cover, on a pedestal 33 on the back plate 24 of the framework of the movement, and for access, with this bell or plain cover removed, to the adjustments of the clock (Fig. 2).

The central minute hand shaft 35 of the movement within the clock is projected through the pedestal 33, with the milled head 36 provided such as usual in clocks for the purpose of altering the time by hand.

For an alarm clock there appears (Fig. 2) the spindle 96, understood to be actuated by the mechanism of the alarm, carrying the hammer 94, within the concavity of the gong, 32 included within the annulus (Figs. 2 and 3).

For the switch hereinbefore referred to there is the provision (Fig. 2) of a metal boss 97 electrically isolated on the outer face of the plate 24, that is towards the pitch face 31 of the battery 29, so located on the plate 24 as to make it possible with the battery 29 in position within the case 20 to have the metal boss of the carbon terminal herein before referred to immediately opposite this metal facing as well as sufficiently near thereto.

To the boss 97 will be connected one of the terminals of the electro-magnet of the time movement, and, per medium of its make and break, on terminal of the alarm bell magnet.

Mounted on the plate 24 is a post 98 (Fig. 2) with retaining washer and pin, carrying a bent lever 99. One arm of this lever is projected into the space exposed by removing the alarm bell of this clock to be accessible within the annulus for adjustment by hand. On the other arm is carried a contact pin 100, insulated from the rest of the lever 99, for the purpose of engaging and making electric contact, in one position of the lever 99, between the positive terminal of the battery 29 and the boss 97 insulated on the plate 24.

Levers 113, 117, (Fig. 2), are shown accessible within the annulus under the cover of the gong 32, for readjustment in connection with the alarm mechanism control of this clock.

We claim:—

In electric self-contained timepieces alarms and the like, an annular removable dry cell in which a plurality of carbons are packed in an electrolyte in one zinc-walled annulus, with connective wiring in the non-conducting cover over the electrolyte leading to a positive terminal in juxta-position with a contact isolated on the movement of the clock, substantially as described.

In testimony whereof we have hereunto set our hands.

OCTAVIA NEWTH.
BASIL NEWTH.